May 21, 1935. H. E. BLOOD 2,001,762
AUTOMOBILE TRANSMISSION MECHANISM
Filed Jan. 20, 1930
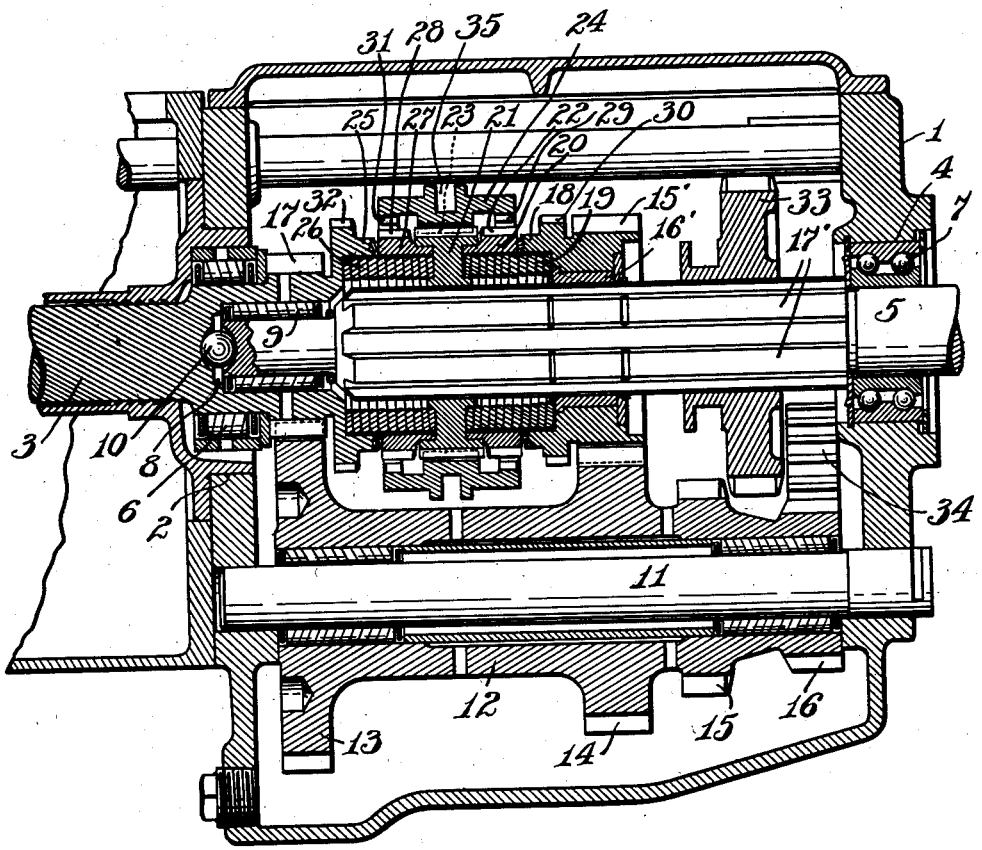
INVENTOR.
Howard E. Blood,
BY
Hood + Hahn.
ATTORNEYS Patented May 21, 1935

2,001,762

UNITED STATES PATENT OFFICE 2,001,762

AUTOMOBILE TRANSMISSION MECHANISM

Howard E. Blood, Detroit, Mich., assignor, by mesne assignments, to Free Wheeling Patents Corporation, South Bend, Ind., a corporation of Delaware Application January 20, 1930, Serial No. 421,937

5 Claims. (Cl. 192—48)

My invention relates to improvements in transmissions for automobiles and has as one of its objects the provision of a transmission having a one-way drive between the driving and driven shaft on the first two high speeds of the transmission whereby, when the automobile is being driven through either high or next high speed of the transmission, and the automobile, or driven shaft thereof, operates at a speed greater than the speed of the drive shaft, the two shafts will be automatically disconnected.

A further object of my invention is to provide means whereby through the same mechanism the one-way operating device may be rendered inoperative so that the driving and driven shafts are positively connected either during high or next high speed.

For the purpose of disclosing my invention, I have illustrated one embodiment thereof in the accompanying drawing, in which:

The figure is a longitudinal sectional view of a transmission embodying my invention.

In the structure illustrated, I provide the usual transmission housing 1 having an opening 2 at its front end for the reception of the driving shaft 3 and an opening 4 at its opposite end for the reception of the driven shaft 5. Suitable bearings 6 and 7 may be respectively provided within these openings for the respective shafts. The driving shaft 3 is connected through suitable clutching mechanism, not shown, with the engine and the driven shaft 5 is connected with the propeller shaft of the automobile. The driven shaft at its forward end is reduced in diameter and takes into an opening 8 in the rear end of the drive shaft, suitable bearings 9 being provided between the shafts and a suitable ball thrust bearing 10 being likewise provided between the end of the shaft 5 and the bottom of the recess in the shaft 3.

The usual counter-shaft 11 is provided on which is mounted a spool 12 provided with gears 13, 14, 15 and 16. The gear 13 is adapted to mesh with and be driven from a gear 17 on the shaft 3 so that the spool 12 is constantly driven from this shaft. The gear 14 is adapted to mesh with a gear 15' rotatably mounted on a spool 16' in turned splined on the shaft 5, the shaft 5 being provided with suitable splines 17' to co-operate with the splines of the spool 16' as well as with some of the members to be described. This gear 15' is provided with a barrel 18 within which is mounted a coiled spring 19, the diameter of the spring being just a few thousandths of an inch greater than the inside diameter of the barrel. The opposite end of this spring fits within a barrel 20 rotatably supported in a collar 21 splined on the splines 17' of shaft 5 and the external diameter of the last mentioned end of said spring is a few thousandths of an inch greater than the internal diameter of the barrel 20, so as to have frictional engagement with the inner surface of said barrel. The outer periphery of the barrel 20 is provided with clutch teeth 22 adapted to align with clutch teeth 23 on the collar 21. Surrounding the collar 21 is an axially shiftable clutch member 24 having teeth meshing with the teeth 23 and adapted, when axially shifted to the right, to also engage with the teeth 22 whereby the collar 21 and barrel 20 may be interlocked. By this arrangement, the gear 15' is connected to the shaft 5 by means of an overrunning or one-way clutch. Due to the construction and mounting of the spring, when the barrel 18 is driven from the drive shaft 3 in a direction to unwind the spring, the spring will tend to expand thereby locking the barrel 20 with the barrel 18 and thus effecting a driving connection between the gear 15' and the shaft 5. However, when the shaft 5 tends to overrun the gear 15', the engagement of the barrel 20 with the spring 19 tends to coil said spring and wind the spring tighter, whereby the two barrels 20 and 18 are disconnected, permitting the shaft 5 to run free of the gear 15'.

The end of the shaft 3 is provided with a barrel 25 adapted to receive a coiled spring 26 which fits the same in the same manner as does the spring 19 fit the barrel 18 and surrounding this spring and supported on the collar 21 is a second barrel 27 co-operating with the spring in the same manner as does the barrel 20 with the spring 19. This barrel 27 is provided with teeth 28 adapted to be engaged by the teeth of the clutch member 24 when the same is moved to the left whereby the shafts 3 and 5 will be directly connected through an overrunning clutch which will permit the shaft 5 to become disconnected from the shaft 3 when the speed of the shaft 5 is greater than that of the shaft 3.

The clutch member 24 is provided on one side with a set of clutching teeth 29 adapted, when the clutching member is moved to its extreme right hand position, to mesh with clutching teeth 30 on the gear 15'. This clutch member is also provided with a set of teeth 31 adapted to mesh, when the member 24 is moved to its extreme left-hand position, with clutching teeth 32 on the shaft 3 whereby, in event it is desired to render either of the overrunning clutches inoperative, by moving the clutch member to the extreme right, the gear 15' is rigidly, or non-rotatively, associated with the shaft 5; and by moving the clutch member 24 to the extreme left, the shafts 5 and 3 are rigidly, or non-rotatively, associated with each other, and the overrunning clutch is rendered inoperative.

For the purpose of operating the driven shaft 5 at low speed, the gear 33 which is splined on the shaft 5 is adapted to be moved into mesh with the gear 15 and for reversely driving the shaft the gear 33 is adapted to mesh with an idler 34 driven from the gear 16.

The operation of the device is as follows: The parts are shown in the drawing with the transmission mechanism in neutral with the shafts 3 and 5 entirely disconnected. The transmission is operated for low speed driving in the usual manner. In order to operate the shaft 5 at second speed, the clutch member 24 is shifted to the right through the medium of a shifter fork engaging the annular groove 35, until the barrel 20 is locked to the collar 21. This connects the gear 15' to the shaft 5 and the drive is from the gear 17 through the gears 13, 14 and 15', the spring 19, barrel 20, clutch member 24, and collar 21 to the driven shaft 5, thus operating the shaft at second speed. To drive at high speed the clutch member 24 is shifted to the left until the barrel 27 is locked to the collar 21 thereby directly connecting the shafts 3 and 5 through the spring 26. In each instance, however, the connection is through the overrunning clutch above described so that in event the speed of the shaft 5 becomes greater than the speed of the shaft 3, the two shafts will be disconnected permitting the shaft 5 to run free.

In event it is desired to render the overrunning clutch inoperative when driving either at high or second speed, it is only necessary to move the clutch member 24 farther to the right or left as the case may be to engage the teeth 29 and 30 or the teeth 31 and 32 in which event the driving shaft will be connected to the driven shaft in such a manner to cause the shafts to operate together in either direction.

I claim as my invention:

1. A structure adapted for use in a vehicle transmission which includes gear elements, said structure comprising drive and driven members, a normally disconnected one-way clutch unit, and means movable with respect to said one-way clutch unit and with respect to each of said gear elements of the associated transmission for rendering said one-way clutch unit operative to connect said members, said means being also operable to connect said members independently of said one-way clutch unit.

2. A structure adapted for use in a vehicle transmission which includes gear elements, said structure comprising drive and driven shafts, a normally disconnected one-way clutch unit, and means movable with respect to said one-way clutch unit and with respect to each of said gear elements of the associated transmission for rendering said one-way clutch unit operative to connect said shafts, said means being further movable with respect to said unit and each of said gear elements to connect said shafts independently of the one-way clutch unit.

3. A structure adapted for use in a vehicle transmission which includes gear elements, said structure comprising drive and driven members, a one-way clutch unit, and means movable with respect to said one-way clutch unit and with respect to each of the gear elements of the associated transmission and in one direction to render said one-way clutch unit operative to connect said members, said means being further movable in the same direction to connect said members independently of said one-way clutch unit.

4. In a transmission mechanism, a pair of shafts, a friction surface associated with one of said shafts and normally out of driving connection therewith, a clutch spring including a plurality of convolutions more than one of which is adapted to be varied in diameter to drivingly engage said friction surface, means for connecting a portion of said clutch spring to the second of said shafts, and means drivingly connected with the first of said shafts and movable into a position to drivingly connect the friction surface to its shaft.

5. In a transmission mechanism, a pair of shafts, a friction surface associated with one of said shafts and normally out of driving connection therewith, a clutch spring including a plurality of convolutions more than one of which is adapted to be varied in diameter to drivingly engage said friction surface, means for connecting a portion of said clutch spring to the second of said shafts, and means drivingly connected to the first mentioned shaft and movable to one position for connecting the friction surface to its shaft to establish a one-way drive between said shafts, and to a second position for directly connecting both shafts to establish a two-way drive.

HOWARD E. BLOOD.